US010334094B1

(12) United States Patent
Zhidov et al.

(10) Patent No.: US 10,334,094 B1
(45) Date of Patent: Jun. 25, 2019

(54) TELEPHONE NETWORK SYSTEM AND METHOD

(71) Applicant: Flypsi, Inc., Denton, TX (US)

(72) Inventors: Ivan Zhidov, Chickasha, OK (US); Peter A. Rinfret, Nantucket, MA (US); Sunir Kochhar, Oro Valley, AZ (US)

(73) Assignee: Flypsi, Inc., Denton, TX (US)

( * ) Notice: Subject to any disclaimer, the term of this patent is extended or adjusted under 35 U.S.C. 154(b) by 0 days.

(21) Appl. No.: 16/031,806

(22) Filed: Jul. 10, 2018

Related U.S. Application Data

(63) Continuation of application No. 15/582,091, filed on Apr. 28, 2017, now Pat. No. 10,051,105, which is a continuation of application No. 14/307,052, filed on Jun. 17, 2014, now Pat. No. 9,667,770, which is a continuation-in-part of application No. 13/944,853, filed on Jul. 17, 2013, now abandoned.

(51) Int. Cl.
*H04M 3/42* (2006.01)
*H04M 1/725* (2006.01)
*H04W 76/10* (2018.01)
*H04M 3/436* (2006.01)
*H04L 29/06* (2006.01)
*H04M 3/56* (2006.01)

(52) U.S. Cl.
CPC ... *H04M 1/72547* (2013.01); *H04M 3/42042* (2013.01); *H04M 3/42272* (2013.01); *H04L 65/1069* (2013.01); *H04M 3/436* (2013.01); *H04M 3/565* (2013.01); *H04M 2203/5054* (2013.01); *H04W 76/10* (2018.02)

(58) Field of Classification Search
CPC ......... H04M 1/72547; H04M 3/42042; H04M 3/42272; H04M 3/565; H04M 3/436; H04M 2203/5054; H04L 65/1069; H04W 76/10
See application file for complete search history.

(56) References Cited

U.S. PATENT DOCUMENTS

| 9,008,298 | B2 | 4/2015 | Wright et al. |
| 9,667,770 | B2 | 5/2017 | Zhidov et al. |
| 10,051,105 | B2 | 8/2018 | Zhidov et al. |
| 2004/0076272 | A1 | 4/2004 | Zafar et al. |

(Continued)

FOREIGN PATENT DOCUMENTS

| CN | 101112053 A | 1/2008 |
| WO | WO 2001/054364 A1 | 7/2001 |

(Continued)

OTHER PUBLICATIONS

Decision for Grant dated Dec. 27, 2016 for Korean Patent Application No. 10-2016-7001879, 3 pages.

(Continued)

*Primary Examiner* — Nam T Huynh

(57) ABSTRACT

Systems for and methods of delivering telephone calls using the combination of a data channel and a voice channel are disclosed. A data channel connection with the telephone handset may provide pre-call information used to set up incoming and outgoing calls which are ultimately connected using a voice channel. Use of the pre-call information may permit the same handset to be associated with multiple secondary telephone numbers from which calls appear to have been made and to which calls appear to have been placed.

12 Claims, 6 Drawing Sheets

(56) References Cited

U.S. PATENT DOCUMENTS

| | | |
|---|---|---|
| 2006/0140200 A1 | 6/2006 | Black et al. |
| 2008/0008105 A1 | 1/2008 | Black et al. |
| 2009/0060155 A1 | 3/2009 | Chingon et al. |
| 2009/0086953 A1 | 4/2009 | Vendrow |
| 2010/0130228 A1 | 5/2010 | Vendrow et al. |
| 2013/0028250 A1* | 1/2013 | Ma .................. H04L 65/1053 370/352 |
| 2013/0102298 A1 | 4/2013 | Goodman |

FOREIGN PATENT DOCUMENTS

| | | |
|---|---|---|
| WO | WO 2004/049625 A1 | 6/2004 |
| WO | WO 2004/073288 A2 | 8/2004 |

OTHER PUBLICATIONS

Decision for Grant dated Sep. 8, 2016 for Japanese Patent Application No. 2016-516091, 4 pages.
Extended European Search Report dated Apr. 26, 2017 for European Patent Application No. 14827040.8, 13 pages.
Extended European Search Report dated Feb. 12, 2019 for European Patent Application No. 18188562.5, 7 pages.
International Search Report and Written Opinion dated Mar. 9, 2015 for International Application No. PCT/US2014/042736.
Notice of Allowance dated Jan. 23, 2017 for U.S. Appl. No. 14/307,052, 11 pages.
Notice of Allowance dated May 23, 2018 for U.S. Appl. No. 15/582,091, 5 pages.
Office Action dated Feb. 11, 2016 for Canadian Patent Application No. 2918352, 5 pages.
Office Action dated May 2, 2017 for Chinese Patent Application No. 201480040216.9, with English translation, 27 pages.
Office Action dated May 23, 2016 for Korean Patent Application No. 2016-7001879, with English translation, 7 pages.
Office Action dated Sep. 2, 2016 for Chinese Patent Application No. 201480040216.9, with English translation, 36 pages.
Office Action dated Aug. 18, 2016 for U.S. Appl. No. 13/944,853, 8 pages.
Office Action dated Dec. 27, 2016 for U.S. Appl. No. 13/944,853, 10 pages.
Office Action dated Jul. 13, 2016 for U.S. Appl. No. 14/307,052, 9 pages.
Office Action dated Nov. 18, 2015 for U.S. Appl. No. 13/944,853, 11 pages.
Office Action dated Jan. 25, 2018 for U.S. Appl. No. 15/582,091, 6 pages.
Supplementary Partial Search Report dated Jan. 17, 2017 for European Patent Application No. 14827040, 6 pages.

\* cited by examiner

TELEPHONE NETWORK SYSTEM AND METHOD

CROSS-REFERENCE TO RELATED APPLICATIONS

The present application claims the benefit, under 35 U.S.C. § 120, as a continuation of U.S. patent application Ser. No. 15/582,091, now U.S. Pat. No. 10,051,105, filed Apr. 28, 2017, entitled "Telephone Network System and Method," which is a continuation of and which claims priority benefit, under 35 U.S.C. § 120, to U.S. patent application Ser. No. 14/307,052, now U.S. Pat. No. 9,667,770, filed Jun. 17, 2014, entitled "Telephone Network System and Method," which is a continuation-in-part of and which claims priority benefit, under 35 U.S.C. § 120, to U.S. patent application Ser. No. 13/944,853, filed on Jul. 17, 2013, entitled "A Method Of A Data Channel Telephone Network System," the disclosure of each of which is incorporated herein by reference in its entirety.

FIELD OF THE INVENTION

The present invention relates to systems and methods for setting up and connecting telephone calls, and delivering information related to such telephone calls using an Internet Protocol (IP) or other data channel while delivering the voice portion of the call in accordance with CDMA, GSM or like voice channel delivery standards.

BACKGROUND OF THE INVENTION

The volume of telephone calls and text messaging has increased dramatically and users are finding it more and more difficult to manage that volume of calls and messages. The current systems to aid in managing some types of calls only provide minimal assistance to the user. It is therefore an advantage of some, but not necessarily all, embodiments of the present invention to provide systems and methods for assisting callers and call recipients with the management of calls and messages.

Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicant has developed an innovative method of providing telephone service by transmitting call handling information between a handset and a switch using an IP channel or similar protocol channel and by transmitting a voice call associated with the call handling information between the handset and the switch using a voice channel provided in accordance with a voice channel protocol, e.g., in accordance with CDMA or GSM, 3G, 4G, LTE or like future protocol channels standards.

Applicant has further developed an innovative method of providing telephone service comprising: automatically storing electronic information that indicates an association of a secondary telephone number and a primary telephone number with a telephone handset in a computer memory associated with a server; automatically storing electronic information that indicates a selection of call processing rules for the primary telephone number in the computer memory; automatically storing electronic information that indicates a selection of call processing rules for the secondary telephone number in the computer memory; receiving an electronic indication of an incoming call to the secondary telephone number at the server, said electronic indication of an incoming call being received from a switch associated with the server; automatically accessing the call processing rules for the secondary telephone number under the control of the server responsive to the receipt of the electronic indication of the incoming call to the secondary telephone number; automatically handling the incoming call in accordance with the accessed call processing rules for the secondary telephone number; transmitting pre-call information via a data channel to the handset under the control of the server, said pre-call information including a bridge telephone number for connecting the handset to the incoming call at the switch; and receiving, at the server via the data channel, an electronic indication of a selection of a call processing rule for handling the incoming call to the secondary telephone number, or establishing a voice channel connection between the handset and the switch as a result of the handset calling the switch using the bridge number.

Applicant has further developed an innovative method of providing telephone service, comprising: automatically storing electronic information that indicates an association of a secondary telephone number and a primary telephone number with a telephone handset in a computer memory associated with a server; automatically associating a unique bridge telephone number with each of a plurality of contact telephone numbers in the computer memory; automatically transmitting information that indicates the association of the unique bridge telephone number with each of a plurality of contact telephone numbers to the handset via the data channel; automatically associating each primary telephone number and bridge telephone number pairing with a corresponding secondary telephone number and contact telephone number pairing in the computer memory; receiving, at a switch associated with the server, an outgoing call from the handset to the bridge telephone number via a voice channel; receiving, at the server, information from the switch indicating the outgoing call is being made to the bridge telephone number from the primary telephone number; receiving, at the switch, information from the server directing the switch to: (a) connect the outgoing call to a contact telephone number associated with the primary telephone number and bridge telephone number pairing, and (b) identify the telephone number from which the outgoing call is being made as the secondary telephone number.

Applicant has still further developed an innovative method of providing telephone service, comprising: enrolling a telephone handset in a telecommunications system having a server and a switch, wherein said telephone handset is associated with a primary telephone number in a database associated with the server and switch; electronically transmitting an application from the server to the telephone handset via a data channel responsive to telephone handset enrollment, wherein said application is: adapted to send instructions to have one or more secondary telephone numbers referenced to the primary telephone number in the database, adapted to present visually perceptible call processing rules on the telephone handset, and adapted to transmit information indicating a selection of call processing rules from the telephone handset to the server; electronically receiving instructions from the telephone handset via the data channel to reference the one or more secondary telephone numbers to the primary telephone number; storing telephone handset information, including the primary telephone number and the one or more secondary telephone numbers referenced to the primary telephone number, in the database; electronically receiving instructions from the telephone handset via the data channel to store user selected call processing rules for the telephone handset in the database, wherein the user selected call processing rules include instructions to route calls over a voice channel in a manner that will indicate that the calls are made to or from the one or more secondary telephone numbers; electronically transmitting information to the telephone handset via the data channel, said information being adapted to cause a pre-call information to be displayed on the telephone handset responsive to initiation of an outgoing call using the one or more secondary telephone numbers or an incoming call to the one or more secondary telephone numbers; electronically receiving from the telephone handset via the data channel call handling information indicating a user selected call processing rule to be used to process the outgoing or incoming call; and automatically handling the outgoing or incoming call based on the call handling information.

Applicant has still further developed an innovative method of providing telephone service, comprising: associating a telephone handset with primary and secondary telephone numbers in a database; receiving, from the telephone handset via a data channel, digital information indicating primary call processing rules for handling calls to the first telephone number; storing the primary call processing rules digitally; receiving, from the telephone handset via the data channel, digital information indicating secondary call processing rules for handling calls to the secondary telephone number; storing the secondary call processing rules digitally; receiving a call request to the secondary telephone number; transmitting pre-call information to the telephone handset via the data channel responsive to receipt of the call request, wherein said pre-call information is based on the secondary call processing rules; responsive to the pre-call information, receiving information indicative of a user input to the telephone handset over the data channel; and processing the call based on the stored alternative call processing rules and user input to the telephone handset, wherein said processing includes an option of connecting the call over a voice channel.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

DETAILED DESCRIPTION OF EMBODIMENTS OF THE INVENTION

Reference will now be made in detail to embodiments of the present invention, examples of which are illustrated in the accompanying drawings. It is to be understood that other embodiments may be utilized and structural changes may be made without departing from the scope of the present invention.

It should be noted that in connection with the described embodiments, reference is made to a data channel. A preferred data channel may be an Internet Protocol (IP) channel, which is not a conventional telephone voice channel. However, other data, non-conventional voice, channels over which information may be transmitted between a telephone handset and a server may be used in alternative embodiments of the invention.

Figure 1:
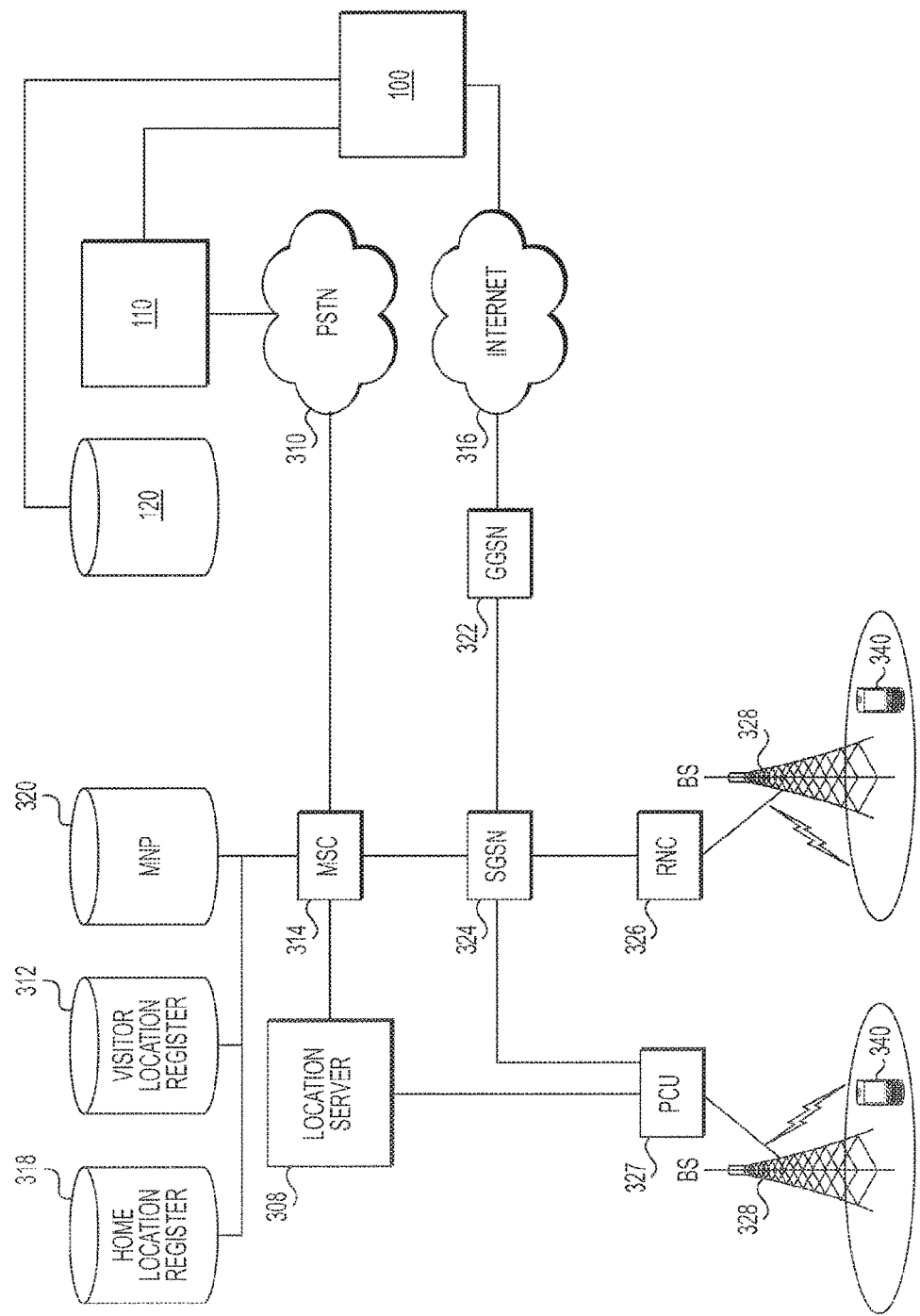
FIG. 1 is a schematic diagram illustrating a network architecture that may be used to provide telephone service in accordance with embodiments of the present invention.

With reference to FIG. 1, embodiments of the present invention may be implemented using a system having a server 100, associated computer memory, such as a database 120, and an associated telecommunications switch 110 which communicate through a network with a telephone handset 340. The server 100 may be connected to the database 120 and the switch 110. The server 100 may also be connected via the Internet 316 through one or more nodes, such as a Gateway GPRS Support Node (GGSN) 322 and a Servicing GPRS Support Node (SGSN) 324, to a mobile network 313. The switch 110 may be connected through the PSTN 310 to the mobile network 313 at a Mobile Switching Center (MSC) 314. In turn, the MSC 314 may be connected to a Home Location Register database (HLR) 318, a Visitor Location Register database (312), a Mobile Number Portability database (MNP) 320, a location server 308, and the SGSN 324. The SGSN 324 may be connected to one or more Radio Network Controllers (RNC) 326 and/or one or more Processor Control Units (PCU) 327, which in turn may be connected to one or more Base Stations (BS) 328 and to one or more mobile devices referred to collectively as "handsets" 340.

The communications between the server 100 and the handset 340 over the Internet 316 may utilize IP as a protocol opposed to protocols used to establish communications according to CDMA, GSM, or like standards. Such IP governed communications are referred to herein as being conducted over a "data channel." Conversely, communications between the switch 110 and the handset over the PSTN 310 may be transmitted and received in accordance with CDMA, GSM or like standards as opposed to using IP. Such CDMA, GSM or like governed communications, when used to carry voice information, are referred to herein as being conducted over a "voice channel."

Figure 2:
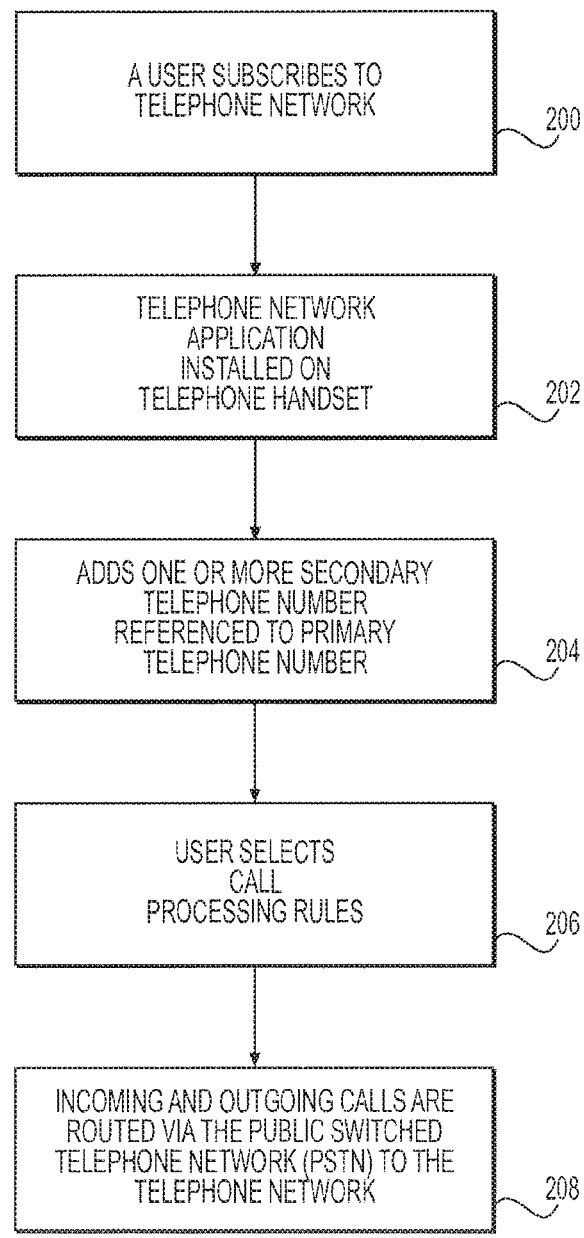
FIG. 2 is a block diagram illustrating a method of providing telephone calls in accordance with embodiments of the present invention.

With reference to FIGS. 1 and 2, method embodiments of the invention may be facilitated starting with step 200 in which a handset 340 may be used to subscribe to 10 the telephone network that includes the server 100 and switch 110 used to provide telephone service in accordance with embodiments of the invention. A user may subscribe to the telephone network in step 200 by enrolling the telephone handset 340 using a data channel connection between the handset and the server 100. Responsive to a data channel request received from the handset 340, a handset application may be transmitted to the handset from the server 100, and installed and stored in memory associated with the handset in step 202. Once the handset application is installed on the handset 340, the handset may connect to the server 100 by operation of the handset application as needed over a data channel connection which may include the BS 328, RNC 326 or PCU 327, SGSN 324, GGSN 322, and Internet 316.

In connection with step 204, the server 100 may transmit information to the handset 340 via the data channel, which, through automatic operation of the handset application, permits the user to select one or more secondary telephone numbers to be referenced to a primary telephone number for the handset. The primary telephone number, preferably, may be a SIM number or ESN which is assigned to the handset 340 at the time of activation. Once selected, the handset 340 may automatically transmit information which to the server 100 over the data channel which requests that the secondary telephone numbers be associated with the primary telephone number. In response. the server 100 may store (i.e., reference) information indicating the association of the one or more selected secondary telephone numbers in computer memory associated with the server such as the database 120. In an alternative embodiment, the server 100 may automatically assign one or more secondary telephone numbers to the handset 340, as opposed to them being selected.

In step 206 of FIG. 2, the handset 340 may be used to access the handset application installed thereon to select call processing rules for handling incoming and outgoing voice channel calls to and from the handset 340. Information indicating call processing rules may be transmitted from the handset 340 to the server 100 via the data channel by automatic operation of the handset application. Custom call processing rules may be selected for, and associated with, each of the primary telephone number and the one or more secondary telephone numbers associated with the primary telephone number. The call processing rules information may be automatically stored in a computer memory, such as database 120, by the server 100. An indication of the association of particular call processing rules with a particular 10 handset 340 and particular primary and/or secondary telephone numbers may also be stored in the database 120. The call processing rules may include preset responses for incoming calls, such as custom stored voice message(s) and/or custom stored text message(s) to be associated with the primary and/or one or more secondary telephone numbers. The call processing rules may further permit the handset 340 to be used to control the availability of the secondary telephone numbers as well as activation of additional secondary telephone numbers and deactivation of existing secondary telephone numbers. Information indicating the call processing rules for the primary telephone number and secondary telephone numbers may be stored automatically in memory associated with the handset 340. The call processing rules may further include stock rules used for all telephone numbers, such as an option to accept or not accept (i.e., drop) an incoming call. With reference to step 208, the application stored on the handset 340 may enable it to be used to receive incoming calls from, and place outgoing calls to, a recipient telephone (not shown) which is connected to the PSTN 310, as explained in more detail below.

Figure 3:
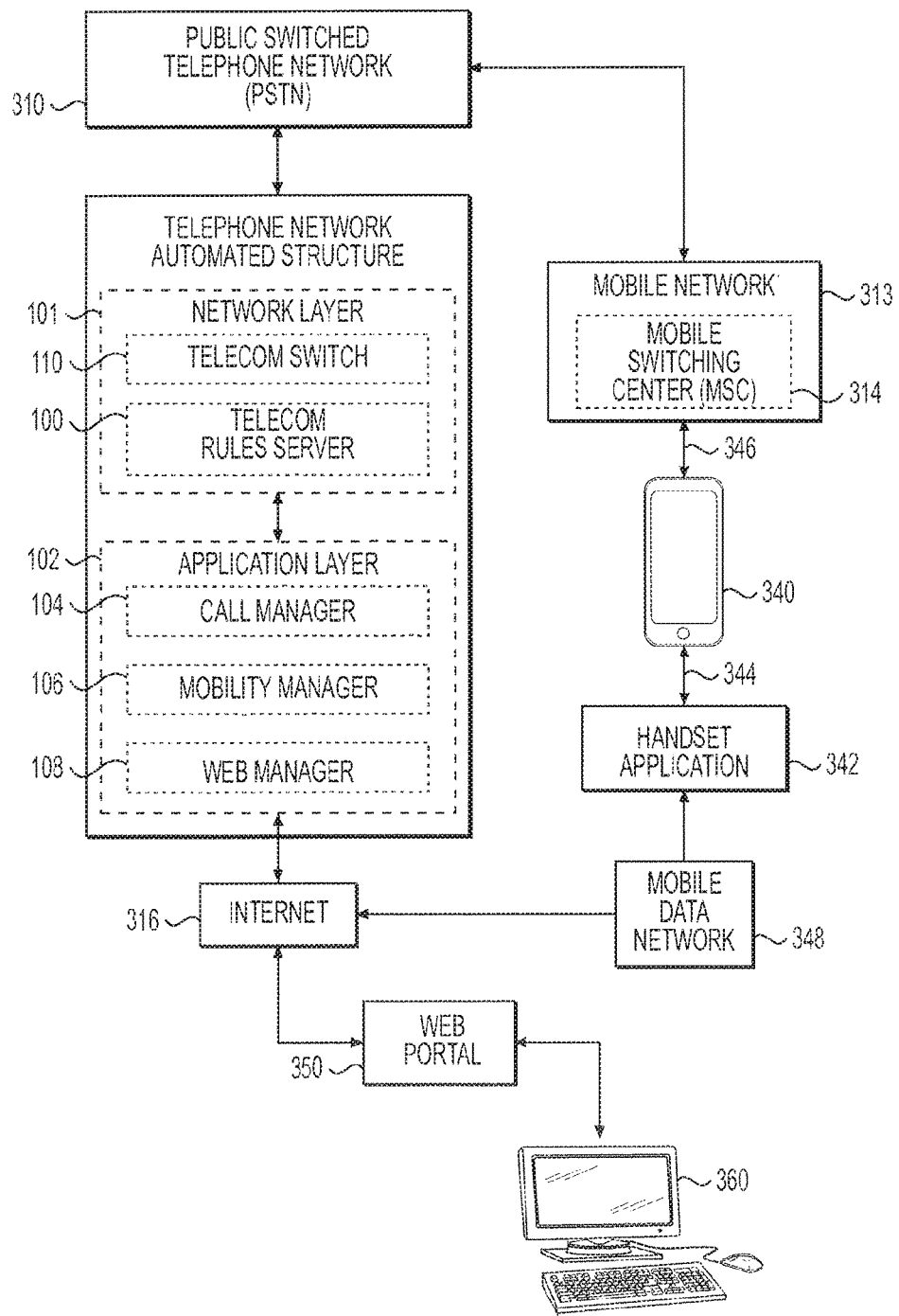
FIG. 3 is a block diagram illustrating data channel and voice channel connections used to provide telephone service in accordance with embodiments of the present invention.
Figure 4:
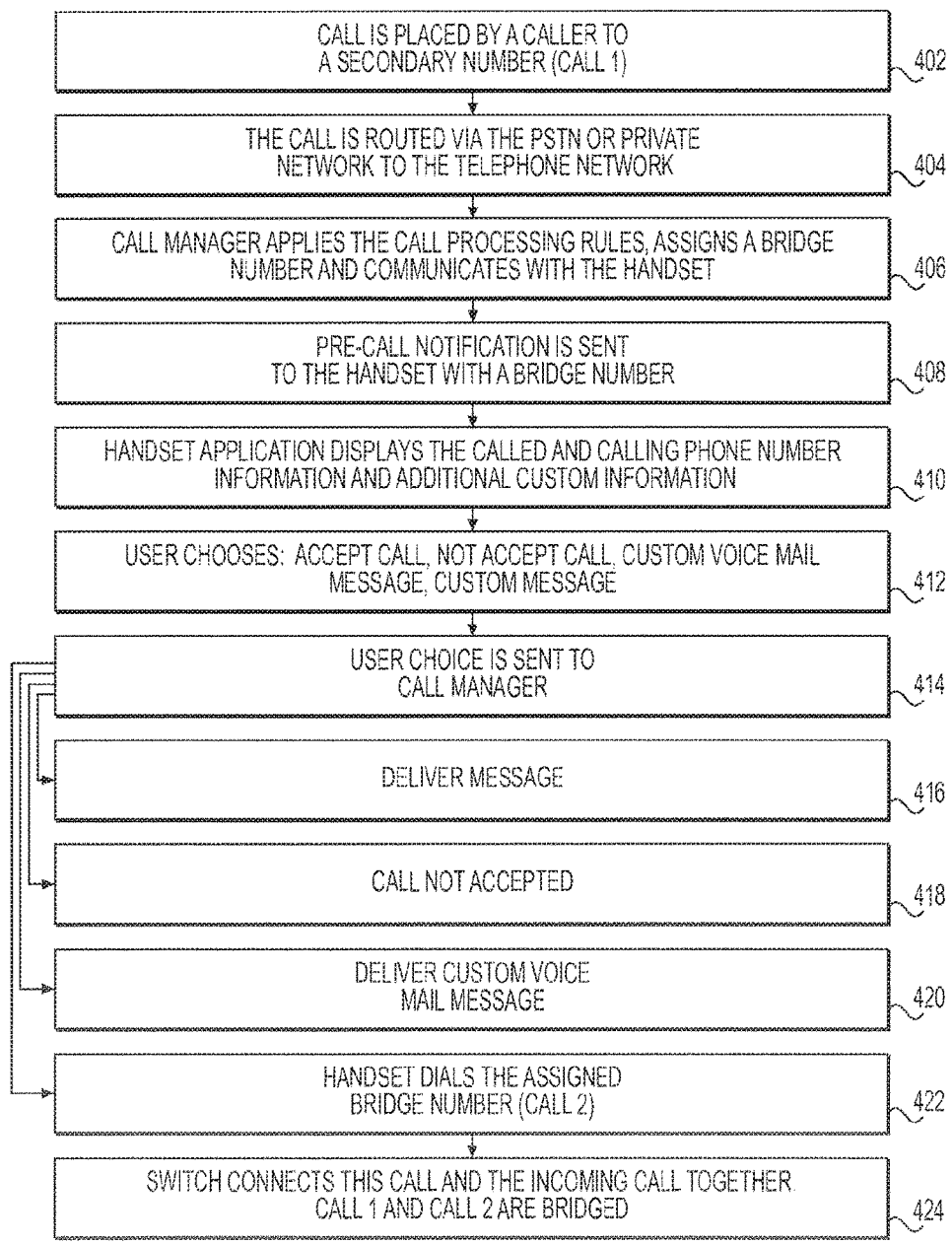
FIG. 4 is a block diagram illustrating a method of setting up and connecting an incoming call in accordance with one embodiment of the present invention.

With reference to FIGS. 3 and 4, the handset 340 may be used to receive incoming (terminating) calls to a secondary telephone number, using a telephone network automated structure having a network layer 101 and an application layer 102 associated therewith. An incoming call to the secondary telephone number may be placed in step 402 by a calling party. The incoming call is routed from the caller's telephone to the PSTN 310. In step 404, the incoming call may be routed over the PSTN 310 to the switch 110 Responsive to receipt of the incoming call at the switch 110, a Call Manager 104 application, which cooperates with a Mobility Manager 106 application, and a Web Manager 108 application, which are all associated with the server 100, may access the call processing rules in the database 120 which are associated with the secondary telephone number that is being called. Subject to the accessed call processing rules, the Call Manager 104 may assign or look up a bridge telephone number to be used for completion of the call in step 406. The bridge telephone number may be associated with the switch 110, and calls to the bridge telephone number may be automatically routed to this switch.

The call processing rules may provide for call routing via a call distribution algorithm where the call could be routed to one or many telephone numbers. The call processing rules may be user selectable and configurable, and may apply to voice, text and/or other data messaging. The call processing rules may govern how calls are handled and may provide automated call routing or call dropping based on location data of the calling and/or called party. The call processing rules may further govern handling calls based on incoming caller ID, which may identify a calling party as being on an accepted caller ID list or a non-accepted caller ID list. The call processing rules may further provide call routing based on weekday, weekend, holiday, time of day, biometrics data, and accelerometer data information. The call processing rules may still further provide call routing based on an interface with a handset 340 calendar to check availability to accept calls. Such calendars may include, for example, Outlook, Google Calendar, and other user calendars.

If the call processing rules indicate that the secondary telephone number is not available to this particular caller, or to all callers, however, the Call Manager 104 may apply such rule or rules and reject the incoming call at the conclusion of step 406. Application of the call processing rules for a call rejection may result in the call simply not being answered, being dropped, or automated return of a voice, text, or other type of message to the calling telephone number or a communication device associated therewith.

On the other hand, if the call processing rules permit completion of the call, in step 408 the Call Manager 104 may transmit pre-call notification information to the handset 340, which includes the assigned/looked up bridge telephone number, via the data channel connection, i.e., over the Internet 316 and the Mobile Data Network 348. The pre-call information may include information used by the application installed on the handset 340 to cause a display of the calling telephone number, the calling party name, calling party location, such as GPS location, and/or the called secondary telephone number, as well as other information in step 410. The incoming pre-call information may be received at the handset 340 before or during the call ringing on the handset.

In step 412, responsive to receipt of the incoming pre-call notification information, the handset application may cause the handset 340 to display call handling choices for the call. For example, the handset 340 may be directed under the control of the handset application to display receive call, drop call, custom voice mail message, and/or custom text message choices. The choices may be selected through interaction with the handset 340, all before the call is connected or dropped. In step 414, the selection of either delivering a responsive text message (416), not accepting, i.e., "dropping" the call (418), or responding to the call with a custom voice message (420) may be transmitted from the handset 340 to the server 100 via the data channel. Thereafter, the Call Manager 104 may automatically implement the drop call or respond with text or voice message instructions received over the data channel, and the call attempt may be terminated thereafter.

If the call is accepted in step 414, however, the handset application may automatically cause the handset 340 to call the bridge telephone number in step 422 over a voice channel. The return call from the handset 340 to the bridge telephone number may be routed over the PSTN 310 to the switch 110 using a voice channel connection. In step 424, once the call to the bridge telephone number is received at the switch 110, the switch may "bridge" the incoming voice channel call to the bridge telephone number with the incoming voice channel call to the secondary telephone number to thereby connect the incoming call from the calling party to the handset 340 via a voice channel. Further, the switch 110 may automatically send signaling information to the calling party telephone which causes the secondary telephone number to be displayed as the number to which the call has been completed.

With continued reference to FIG. 3, the web manager 108 may be used to process Internet 316 transactions for the server 110. The system may also employ a web portal 350 to link a digital device 360 other than a handheld 340 to the telecommunications system for calling in accordance with embodiments of the invention. For example, embodiments of the invention may be used with digital devices 360 such as a desktop computer, laptop computer, IPad, tablet, IPod 790, or the like.

Figure 5:
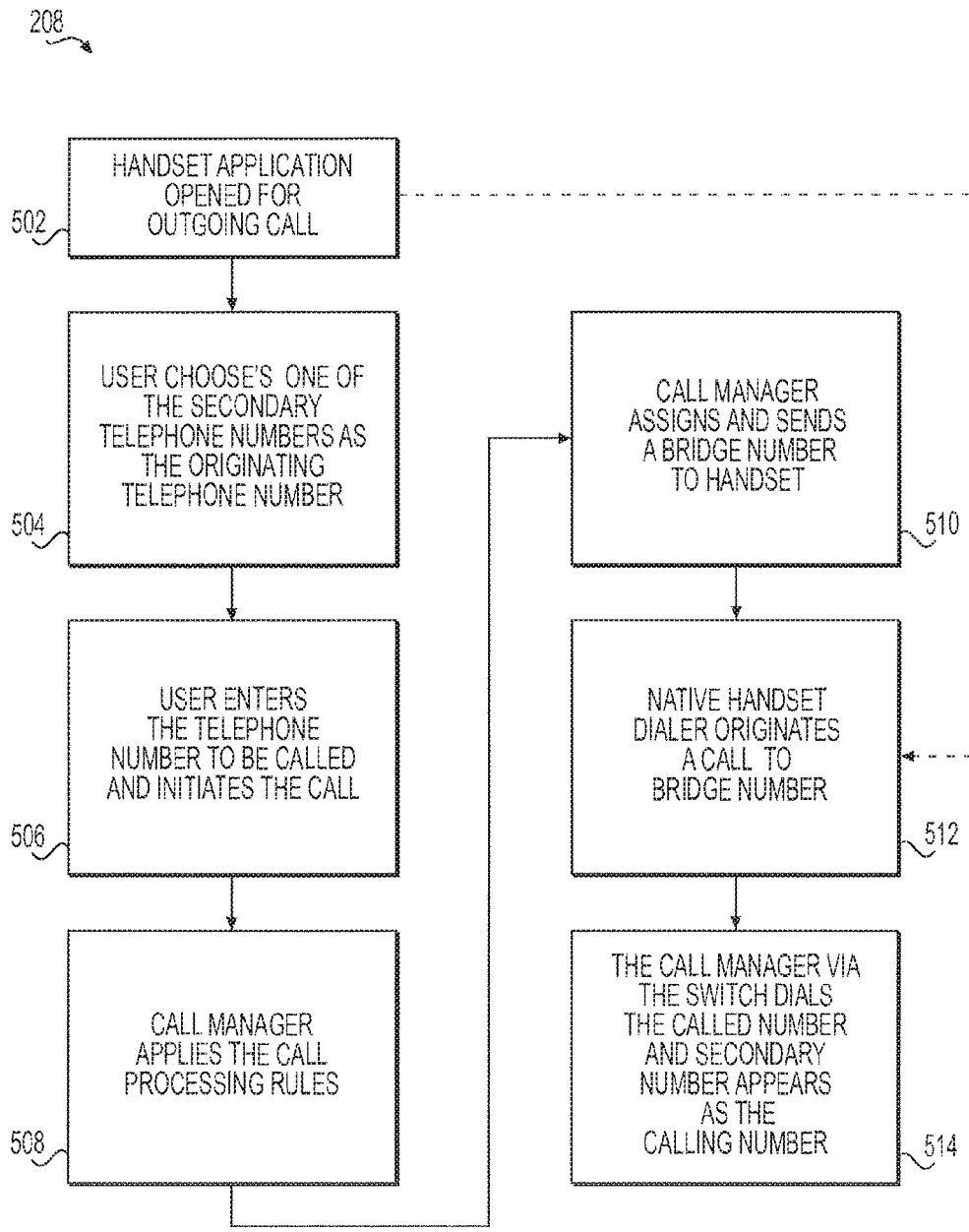
FIG. 5 is a block diagram illustrating a method of setting up and connecting an outgoing call in accordance with one embodiment of the present invention.

With reference to FIGS. 3 and 5, the handset 340 may be used to place outgoing (originating) calls from a secondary telephone number, using the telephone network automated structure shown in FIG. 3 and described above. If the party to be called has not yet been called using a secondary telephone number, an outgoing call from the handset 340 may be initiated to such party in step 502 by opening the handset application installed thereon. Once the handset application is open, the handset 340 may be used to choose a secondary telephone number as the originating telephone number in step 504. A list of such secondary telephone numbers may be stored in memory associated with the handset.

In step 506, the handset 340 may be used to enter, or select from an address file, a contact telephone number to be called in order to initiate a call to such telephone number. The handset application may cause the handset 340 to transmit information to the server 100 Call Manager 104 via the data channel automatically as a result of the selection of the secondary telephone number and the contact telephone number. The transmitted information may indicate the secondary telephone number from which the call is to appear to the called party to have been placed, and the contact telephone number to be called.

In step 508, responsive to receipt of the data channel communication from the handset 340 requesting set up of a call from it to the telephone number to be called, the Call Manager 104 may access the call processing rules in the database 120 which are associated with the secondary telephone number from which the call is to appear to have been placed. In step 510, subject to the accessed call processing rules, the Call Manager 104 may assign a bridge telephone number to be used to connect the call from the handset 340 to the switch 110 and send pre-call information including the bridge telephone number to the handset via the data channel.

The bridge telephone number may be associated with the switch 110, and calls to the bridge telephone number may be automatically routed to this switch. Once the bridge telephone number is assigned, the server 100 under the control of the Call Manager 104, may store information in the database 120 which associates the bridge telephone number with the primary telephone number for the handset 340, the secondary telephone number selected for the call, and the contact telephone number to be called. More specifically, the stored information may indicate that each combination of primary telephone number and bridge telephone number are uniquely associated with each combination of secondary telephone number and contact telephone number. In other words, each combination of primary telephone number and bridge telephone number for the handset 340 map to a unique combination of secondary telephone number and contact telephone number in the database 120 memory.

In step 512, responsive to receipt of the bridge telephone number information over the data channel, the handset application may cause the handset 340 to automatically call the bridge telephone number via a voice channel. The return call from the handset 340 to the bridge telephone number may be routed over the PSTN 310 to the switch 110 using a voice channel connection.

In step 514, the Call Manager 104 may instruct the switch 110 to place a voice channel call to the telephone number to be called using the secondary telephone number as the originating telephone number from the switch. Once the call to the bridge telephone number from the handset 340 is received at the switch 110, the switch may "bridge" the incoming voice channel call to the bridge telephone number with the outgoing voice channel call from the secondary telephone number to the contact telephone number to thereby connect the outgoing call from the handset 340 to the party being called via a voice channel. Further, the switch 110 may automatically send signaling information to the called party telephone which causes the secondary telephone number to be displayed as the number from which the call appears to have been placed. Because each pairing of a primary telephone number and a bridge telephone number maps to a unique contact telephone number and secondary telephone number pairing, the call can be completed at the switch 110 to the correct contact telephone number while showing the desired secondary telephone number as the originating number.

With continued reference to FIG. 5, in the event that the contact telephone has been previously called using the secondary telephone number on the handset 340, the user may directly select the bridge telephone number associated with the secondary telephone number and contact telephone number in step 506 either using the handset application in step 502, or without opening the handset application in step 512. Alternatively, the handset may have a stored "shortcut" which, when the user selects the contact telephone number to be called from the secondary telephone number, results in the associated bridge telephone number being dialed. In either case, the handset 340 may dial the bridge telephone number to connect with the Call Manager 104 in step 512. In step 514, the Call Manager 104 may look up the secondary telephone number and the contact telephone number associated with the paired bridge telephone number and primary telephone number for the handset 340. Thereafter, the switch 110 may dial the contact telephone number and bridge the call from the handset 340 in a manner that makes the secondary telephone number appear to be the telephone number from which the call is being placed.

Figure 6:
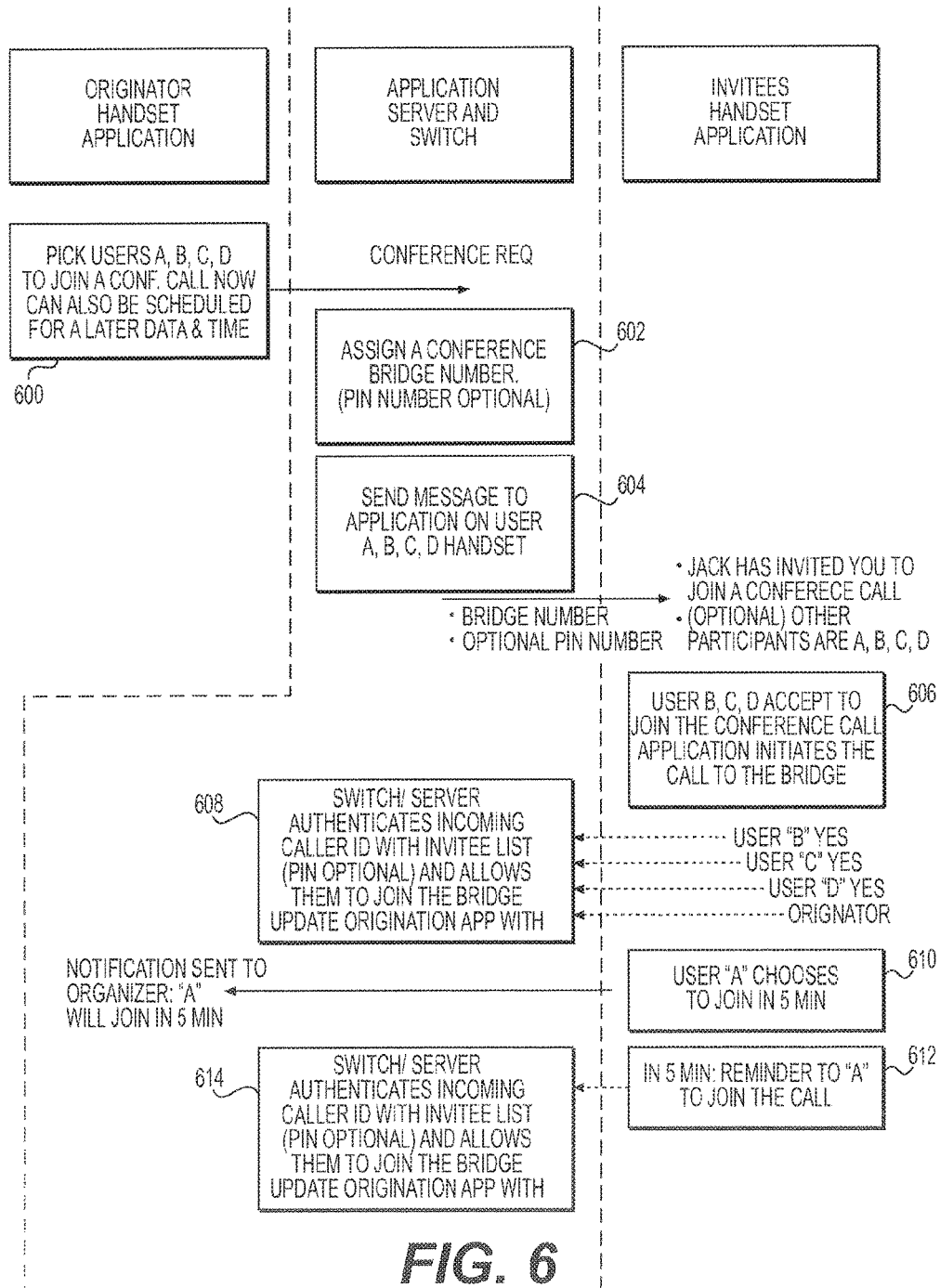
FIG. 6 is a call sequence diagram illustrating a method of setting up and connecting a conference call in accordance with one embodiment of the present invention.

FIG. 6 is a call flow diagram illustrating a method of setting up and connecting a multi-party conference call in accordance with an embodiment of the present invention. With reference to FIGS. 3 and 6, the communication sequence for a conference call is illustrated between the handset application stored on the handset 340, the Call Manager 104 application associated with the server 100 and switch 110, and a conference call invitee handset. In step 600, the application on the handset 340 may be used to select invitees (users) for a conference call. The telephone numbers of the invitees may be selected from an address book or manually entered. Further, the conference call may be selected to be initiated immediately, or at some future date and time.

Once the invitees are selected, the handset 340 may be instructed by the handset application to transmit a conference request to the server 100 via a data channel. In step 602, the Call Manager 104 operating on the server 100 may assign a conference bridge telephone number to the conference call in response to receipt of the conference request. In step 604, the Call Manager 104 may cause the server 100 to send conference invitation messages to each of the invitee handsets, and more specifically, applications stored on the invitee handsets, via a data channel. The invitation messages may include the assigned bridge telephone number for the conference call and an optional PIN or code number for the conference call. The invitation message may provide a notice, for example, "Jack has invited you to join a conference call," and further include identification of other invited participants.

In step 606, each invitee handset may be used to accept to join the conference call, join at a later time, or decline to join. If the acceptance is for a future scheduled conference call, an indication of the acceptance (including acceptance to join late) may be transmitted from each invitee handset under the control of the application installed thereon, to the server 100 Call Manager 104 via the data channel. Further, if the invitation is declined altogether, an indication thereof may be transmitted from each invitee handset to the server 100. Thereafter, the Call Manager 104 may transmit information to the originating handset 340, and optionally the invitee handsets, via the data channel, which indicates acceptance of a future conference call, acceptance to join late (step 610), or declination of the conference call invitation.

If the conference call invitation is accepted and it is time for the call, each accepting invitee handset may automatically or manually dial the bridge telephone number using a voice channel. The switch 110 may receive the voice channel calls to the bridge telephone number and may authenticate the invitees right to join the conference call in step 608 by comparing the invitee's telephone number with that of the invitee list, as well as comparing any PIN input by the invitee with the PIN selected for the conference call. If the authentication is successful, the invitee handset is connected to the call via the voice channel. An automatic update may be transmitted via the data channel from the server to the originating handset 340 indicating that a particular invitee handset has joined the conference call.

If an invitee chose to join late, the server 100 may automatically transmit a reminder to the affected invitee handset to join the call at the agreed time in step 612. Thereafter, the late joining invitee handset may dial the bridge telephone number automatically or manually using a voice channel. The switch 110 may receive the voice channel call to the bridge telephone number, authenticate the late joining invitee handset, and connect the handset to the conference call in step 614.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed:

1. A method of providing telephone service, comprising:
   automatically storing electronic information that indicates an association of a secondary telephone number and a primary telephone number with a telephone handset in a computer memory associated with a server;
   automatically associating a bridge or access telephone number with each of a plurality of contact telephone numbers in the computer memory;
   automatically transmitting information that indicates the association of the bridge or access telephone number with each of a plurality of contact telephone numbers to the handset via a data channel;
   automatically associating each primary telephone number and bridge or access telephone number pairing with a corresponding secondary telephone number and contact telephone number pairing in the computer memory;
   receiving, at a switch associated with the server, an outgoing call from the handset to the bridge or access telephone number via a second channel;
   receiving, at the server, information from the switch indicating the outgoing call is being made to the bridge or access telephone number from the primary telephone number; and
   receiving, at the switch, information from the server directing the switch to: (a) connect the outgoing call to a contact telephone number associated with the primary telephone number and bridge or access telephone number pairing, and (b) identify a telephone number from which the outgoing call is being made as the secondary telephone number.

2. The method of claim 1, wherein the data channel is an Internet protocol (IP) channel.

3. The method of claim 2, wherein the second channel is established in accordance with a CDMA or GSM standard.

4. The method of claim 1, wherein the second channel is not an Internet Protocol (IP) channel.

5. An apparatus, comprising:
   a memory; and
   a processor operatively coupled to the memory, the processor configured to automatically store electronic information that indicates an association of a secondary telephone number and a primary telephone number with a telephone handset in a computer memory associated with a server, the processor configured to automatically associate a bridge or access telephone number with each of a plurality of contact telephone numbers in the computer memory,
   the processor configured to automatically transmit information that indicates the association of the bridge or access telephone number with each of a plurality of contact telephone numbers to the handset via a data channel,
   the processor configured to automatically associate each primary telephone number and bridge or access telephone number pairing with a corresponding secondary telephone number and contact telephone number pairing in the computer memory,
   the processor configured to receive, at the server, information from a switch associated with the server and in response to the switch receiving an outgoing call from the handset to the bridge or access telephone number via a second channel, the information indicating the outgoing call is being made to the bridge or access telephone number from the primary telephone number, the processor configured to send, to the switch, information from the server directing the switch to: (a) connect the outgoing call to a contact telephone number associated with the primary telephone number and bridge or access telephone number pairing, and (b) identify a telephone number from which the outgoing call is being made as the secondary telephone number.

6. The apparatus of claim 5, wherein the data channel is an Internet Protocol (IP) channel.

7. The apparatus of claim 5, wherein the second channel is established in accordance with a CDMA or GSM standard.

8. The apparatus of claim 5, wherein the second channel is not an Internet Protocol (IP) channel.

9. A non-transitory processor-readable medium storing code representing instructions to be executed by a processor, the code comprising code to cause the processor to:

automatically store electronic information that indicates an association of a secondary telephone number and a primary telephone number with a telephone handset in a computer memory associated with a server;

automatically associate a bridge or access telephone number with each of a plurality of contact telephone numbers in the computer memory;

automatically transmit information that indicates the association of the bridge or access telephone number with each of a plurality of contact telephone numbers to the handset via a data channel;

automatically associate each primary telephone number and bridge or access telephone number pairing with a corresponding secondary telephone number and contact telephone number pairing in the computer memory;

receive, at the server, information from a switch associated with the server and in response to the switch receiving an outgoing call from the handset to the bridge or access telephone number via a second channel, the information indicating the outgoing call is being made to the bridge or access telephone number from the primary telephone number; and send, to the switch, information from the server directing the switch to: (a) connect the outgoing call to a contact telephone number associated with the primary telephone number and bridge or access telephone number pairing, and (b) identify a telephone number from which the outgoing call is being made as the secondary telephone number.

10. The non-transitory processor-readable medium of claim 9, wherein the data channel is an Internet Protocol (IP) channel.

11. The non-transitory processor-readable medium of claim 9, wherein the second channel is established in accordance with a CDMA or GSM standard.

12. The non-transitory processor-readable medium of claim 9, wherein the second channel is not an Internet Protocol (IP) channel.

* * * * *